United States Patent [19]

McHale et al.

[11] Patent Number: 4,639,872

[45] Date of Patent: Jan. 27, 1987

[54] METHOD AND APPARATUS FOR DETERMINING WEIGHT AND CENTER OF GRAVITY OF A VEHICLE

[75] Inventors: Charles J. McHale, Pointe Claire; Joseph Marrone, St. Leonard; David Watson, Hudson, all of Canada

[73] Assignee: Aldis Consultants Inc., Montreal, Canada

[21] Appl. No.: 578,874

[22] Filed: Feb. 10, 1984

[51] Int. Cl.⁴ .............................................. G01M 1/12
[52] U.S. Cl. .................................. 364/463; 364/567; 235/61 T; 73/65
[58] Field of Search .............. 364/427, 463, 466, 567; 73/65; 177/25; 235/61 T

[56] References Cited

U.S. PATENT DOCUMENTS

| | | | |
|---|---|---|---|
| 2,735,291 | 2/1956 | Quinn | 364/567 |
| 2,932,188 | 4/1960 | Kennedy | 73/65 |
| 3,191,442 | 6/1965 | Hutchinson | 364/567 |
| 3,584,503 | 6/1971 | Senour | 73/65 |
| 3,662,845 | 5/1972 | Pratt | 177/25 |
| 3,825,734 | 7/1974 | Jacobs et al. | 177/25 |
| 4,163,283 | 7/1979 | Darby | 364/424 |
| 4,463,428 | 7/1984 | Gilliam | 364/463 |
| 4,502,555 | 3/1985 | Gower | 364/463 |

FOREIGN PATENT DOCUMENTS 0028532 5/1981 European Pat. Off. .

Primary Examiner—Gary Chin
Attorney, Agent, or Firm—Charles E. Brown; Charles A. Brown

[57] ABSTRACT

An apparatus for use in determining the weight and the location of the center of gravity of a vehicle, particularly an aircraft prior to its taking off, comprising in combination at least one load-measuring device secured in a roadway and adapted for contacting load-supporting members of the vehicle when such is moved thereover; computer means linked to the load-measuring devices and adapted to receive data therefrom; means for relaying to the operator of the vehicle data computed by the computer means, and sensor means linked to the computer means, the sensor means adapted to read characteristics of the vehicle as it observes the same and alert the computer, programmed for such characteristics. Also disclosed are methods based on use of the disclosed apparatus.

36 Claims, 9 Drawing Figures

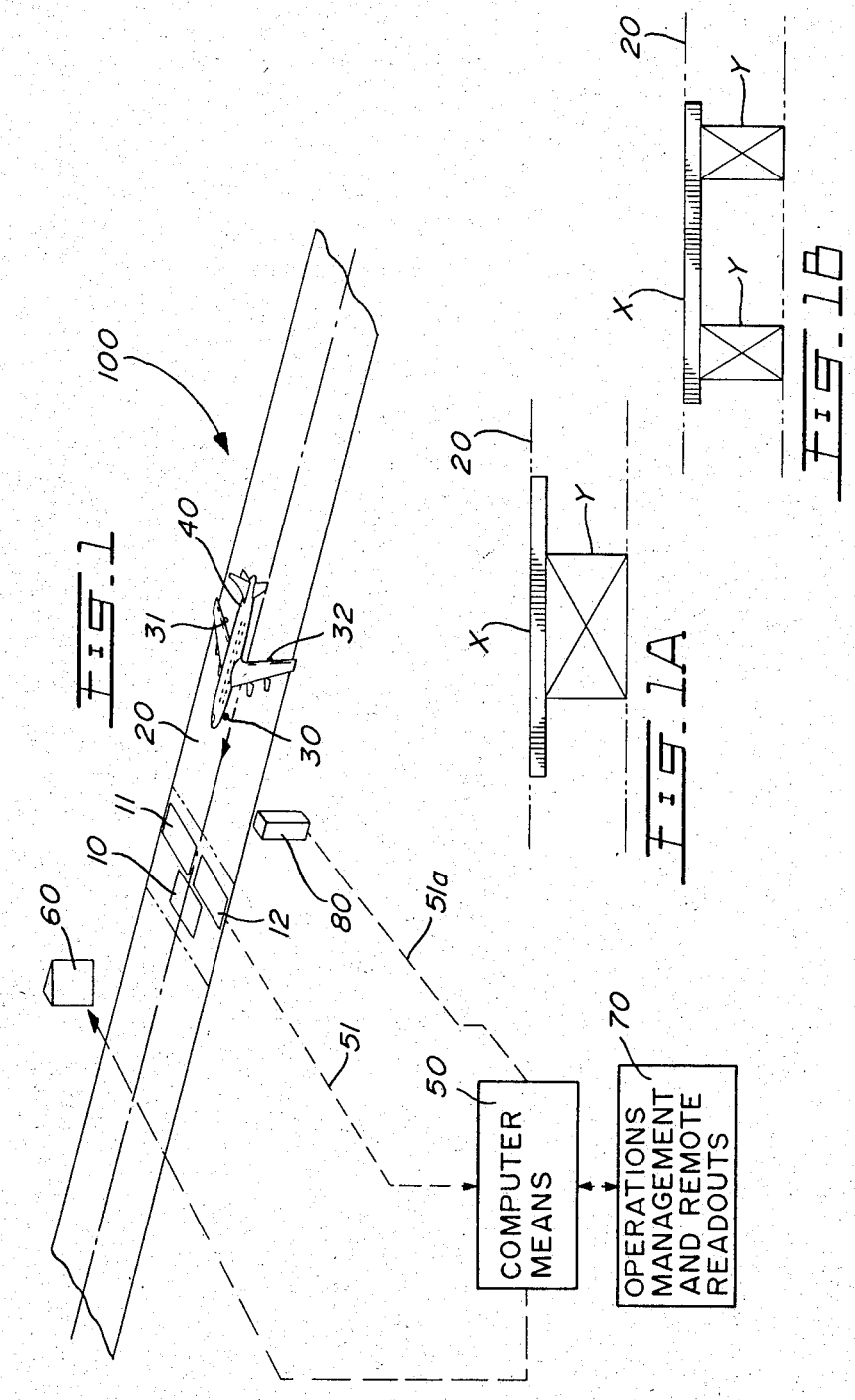

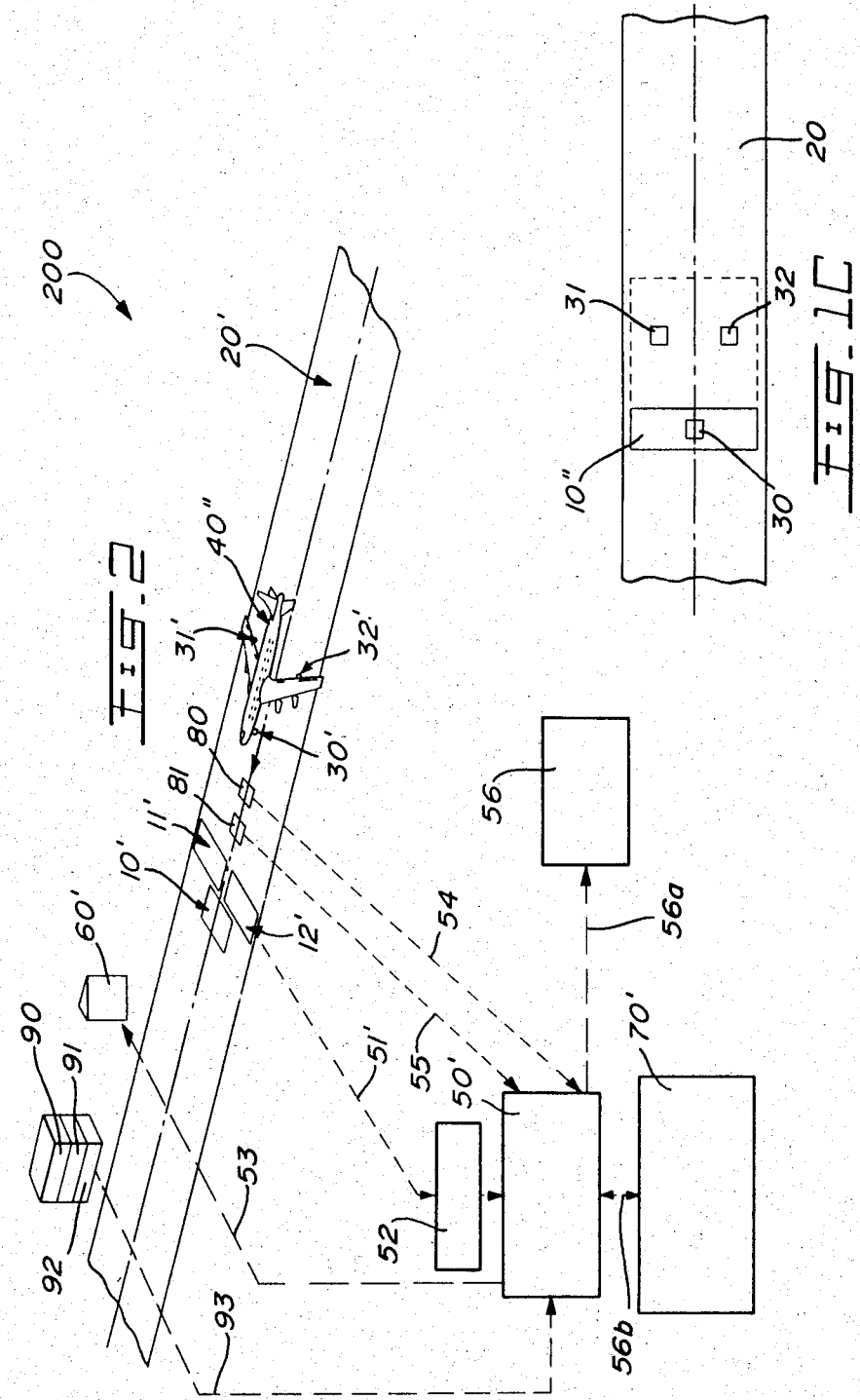

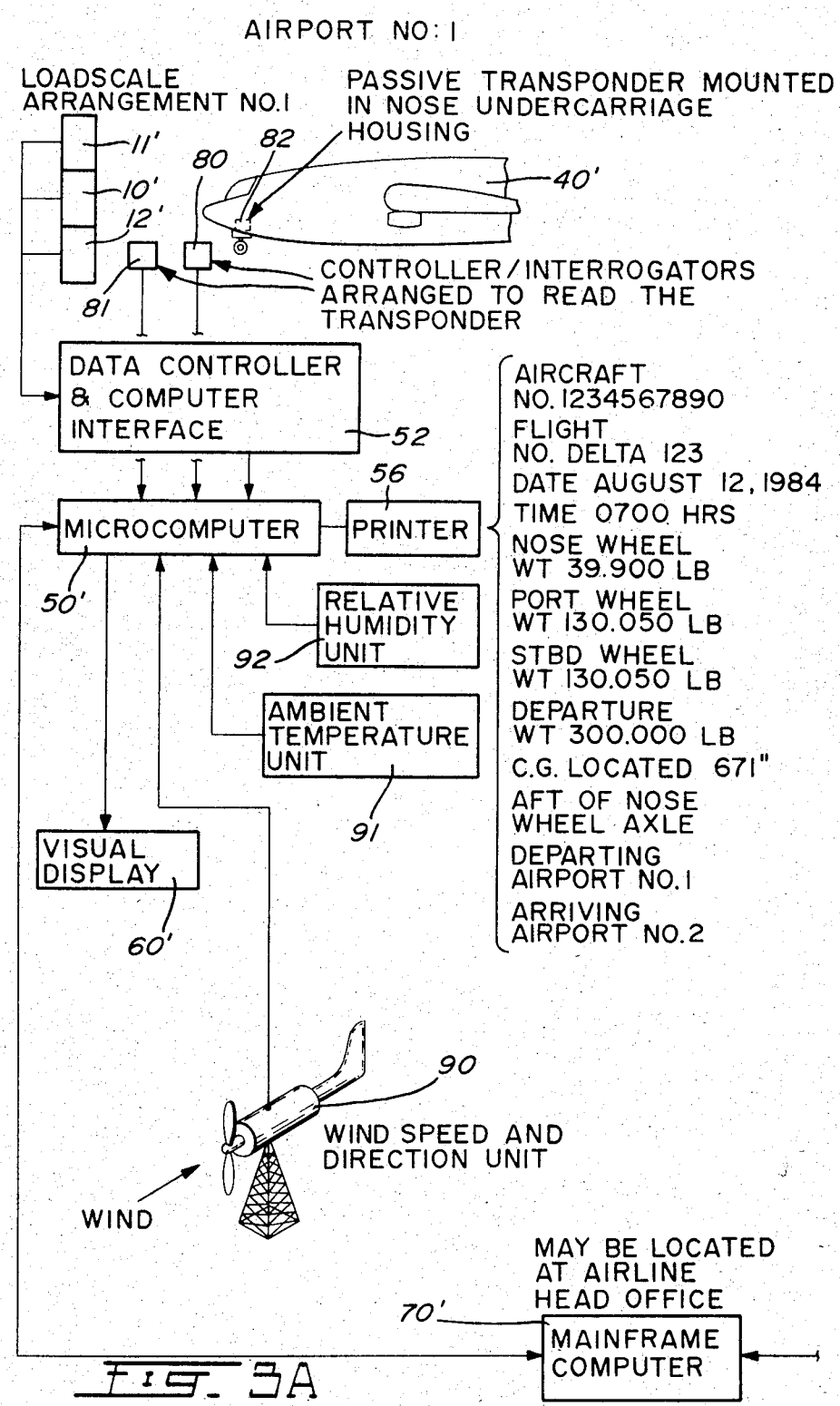

METHOD AND APPARATUS FOR DETERMINING WEIGHT AND CENTER OF GRAVITY OF A VEHICLE

BACKGROUND OF THE INVENTION (1.) Field of the Invention

The present invention relates to methods for determining the weight and the location of the center of gravity, of a vehicle and particularly relates to methods for determining the weight and location of the center of gravity, of an aircraft prior to its taking off, so that the pilot may safely and efficiently execute operation of the aircraft during the takeoff procedure. The invention also relates to apparatus for use in carrying out said methods.

(2.) Description of the Prior Art

Methods and apparatus are known for use in determining the weight and the location of the center of gravity, of an aircraft. However, such methods and apparatus are not always reliable, owing to the conditions under which the apparatus must operate. One example of known apparatus used in the compilation of the weight and center of gravity, of an aircraft comprises load-measuring devices located in the undercarriage arrangements thereof. During landing operations, such devices are subjected to very heavy and sometimes shock loads which can result in their malfunction or destruction.

Problems can exist regarding safe operation of aircraft due to lack of adequate procedures and associated apparatus.

SUMMARY OF THE INVENTION

It is, therefore, an important aim of the present invention to provide improved methods and apparatus for use in determining the weight and the location of the center of gravity, of an aircraft which overcomes the aforementioned problem.

It is also an important aim of the present invention to provide an universal, accurate and reliable method of determining loadings on individual struts of an aircraft and thereby the gross weight of the aircraft.

It is well known that aircraft are not weighed as part of the despatch procedure in their day to day operations. It is also well known that both the gross weight and center of gravity of aircraft are derived by calculation of the various weight components disposed about the "light-weight" center of gravity, as provided by the manufacturer. It is also well known that aircraft undercarriage arrangements may comprise three or more sets of undercarriage components.

It is thus an important aim of the present invention to provide a reliable and practical means of providing weight data for all types of aircraft and related undercarriage configurations, as part of the day-to-day procedure prior to take-off, and after the landing of any aircraft, without disruption of the normal flow of traffic.

It is a further aim of the present invention to provide means whereby the calculated load data, commonly referred to as load and balance calculations, will receive a check against the calculated gross weight and also the position of the center of gravity and alert the aircraft operator to miscalculation.

It is also an important aim of the present invention to alert the aircraft operator in certain circumstances to discrepancies in the calculation, particularly in the case of fuel calculation.

It is also an important aim of the present invention, regarding an aircraft, to provide means whereby feeding calculated component weight data such as passenger and baggage weights, cargo weight and fuel weight calculations into a computing system, a reliable crosscheck will be provided to alert the operator of discrepancies in these calculations, particularly with reference to fuel quantities, prior to executing takeoff procedures.

It is a further aim of the present invention to provide positive means for determining the weight of available fuel in an aircraft, prior to its taking off.

In one aspect of the present invention, there is provided an apparatus for use in determining the weight and the location of the center of gravity, of a vehicle, particularly an aircraft prior to its taking off comprising in combination a plurality of load-measuring devices secured to a roadway and adapted for contacting load-supporting members of the vehicle when such is moved thereover; computer means linked to the load measuring devices and adapted to receive data therefrom; means for relaying to the operator of the vehicle data computed by the computer means, and sensor means linked to the computer means, the sensor means adapted to read characteristics of the vehicle as it observes the same and alert the computer, programed for such characteristics.

In a further aspect of the present invention, there is provided a method for determining the magnitude of load carried by the individual load-supporting undercarriage members of an aircraft, when the members are in contact with the ground, including for example, prior to the aircraft taking off, comprising the steps of moving the aircraft along a pathway therefor and over load-measuring means positioned in the pathway in such manner said load-measuring means is contacted by the individual load-supporting undercarriage members, whereby to record the load data; and utilizing the recorded load data for subsequent operation of the aircraft.

In a further aspect of the present invention there is provided a method for determining the location of the center of gravity of the vehicle, particularly an aircraft prior to takeoff, comprising the steps of moving the vehicle along the roadway or the like over a plurality of load-measuring devices secured in the roadway whereby the individual load-supporting members of the vehicle contact the load-measuring devices for recording the loads applied respectively by the individual load-supporting members; and observing information computed by a computer linked to the devices for receiving data therefrom, the information comprising the center of gravity or information for readily determining the center of gravity.

In a further aspect of the present invention, there is provided a method for determining the location of the center of gravity of a vehicle, particularly an aircraft prior to its taking off, comprising the steps of moving the vehicle over load cell means such that the individual load-supporting members of the vehicle contact the load cell members and register the load applied by the individual load-supporting members; and subsequently operating the vehicle in a manner based upon the registered load data.

In a further aspect of the present invention, there is provided an apparatus for use in determining the weight and the location of the center of gravity of a vehicle, particularly an aircraft prior to its taking off, comprising in combination at least one load-measuring device secured to a roadway and adapted for contacting load-supporting members of the vehicle when such is moved thereover; computer means linked to the load-measuring devices and adapted to receive data therefrom; means for relaying to the operator of the vehicle data computed by the computer means, and sensor means linked to the computer means, the sensor means adapted to read characteristics of the vehicle as it observes the same and alert the computer, programed for such characteristics.

In a still further aspect of the present there is provided a method of determining the amount of fuel consumed by an aircraft during its flight from one airport to another, comprising the steps of moving the aircraft, readied for take-off, along a first pathway therefore and over first load measuring means secured to the pathway, in such manner the load measuring means is contacted by the individual load supporting undercarriage members of the aircraft, whereby to register the loads supported by the members; transmitting the registered load data to a computer means located remote from the first load measuring means and the aircraft, whereby to ascertain the gross weight of the aircraft at take-off; moving the aircraft upon its landing at the further airport along a second pathway therefore and over second load measuring means secured to the second pathway, in such manner the second load measuring means is contacted by the individual load supporting undercarriage members of the aircraft, whereby to register the loads supported by the members; and transmitting the load data registered by the second load measuring means to the computer means, whereby to ascertain the gross weight of the aircraft at landing, computing with the computer means i.e. subtracting the computed gross weight of the aircraft immediately after landing from the computed gross weight of the aircraft prior to take-off, to determine the weight of fuel and thus amount of fuel consumed by the aircraft in travelling from the first load measuring means to the second load measuring means, accordingly between the one airport and the other.

In a still further aspect of the present invention there is provided a method of determining the weight of, and thus the amount of fuel, on board an aircraft prior to its taking off for a destination, comprising the steps of weighing passengers, hand baggage, baggage and cargo prior to their being placed on board the aircraft; ascertaining the gross weight of the aircraft immediately prior to its taking off; substracting from the ascertained gross weight, the "light" or unladen weight of the aircraft, the weight of the passengers, hand baggage, baggage and cargo, whereby to obtain the weight of and thus the amount of, the fuel on board the aircraft immediately prior to its taking off.

In a still further aspect of the present invention there is provided a method of determining the weight of, and thus the amount of, fuel on board an aircraft at given times, comprising the steps of weighing passengers, hand baggage and baggage prior to their being placed on board the aircraft; coding the latter ascertained weights as to destination and/or assigned seating and entering such data into a first computer means located at the airport of departure, also into a second computer means; weighing cargo to be placed on board the aircraft and coding the cargo weight as to destination and entering the cargo coded weight into the first and second computer means; ascertaining the gross weight of the aircraft prior to its taking off and transmitting the ascertained gross weight to the first and second computer means, thereafter subtracting from the ascertained gross weight, the sum of the measured weights of passengers, hand baggage, baggage, cargo and the "light" unladen weight of the aircraft, whereby to obtain the weight and thus the amount of fuel on board the aircraft; ascertaining the gross weight of the aircraft just after its landing at a first destination airport and entering such landing weight data into the second and a third computer means located at the first destination airport; disembarking passengers, hand baggage, baggage and cargo at the first destination airport; substracting the sum of the weight of disembarking passengers, hand baggage, baggage and cargo coded for the first destination airport from the ascertained gross weight of the aircraft just after landing; weighing new passengers, hand baggage and baggage prior to their being placed on board the aircraft; coding the latter ascertained weights as to destination and/or assigned seating and entering such data into the second and third computer means; weighing new cargo to be placed on board the aircraft and coding the cargo weight as to destination and entering the cargo coded weight into the second and third computer means; and ascertaining the gross weight of the aircraft prior to its taking off and transmitting the latter ascertained gross weight to the second and third computer means, thereafter substracting from the latter ascertained gross weight, the sum of the measured weights of passengers, hand baggage, baggage and cargo and the "light" unladen weight of the aircraft, whereby to obtain the weight and thus the amount of, fuel on board the aircraft.

In a still further aspect of the present invention, there is provided an apparatus for use in determining the static or dynamic weight of an aircraft while on the ground, the aircraft including main load supporting members and secondary tail or nose load supporting members, comprising in combination; a first load measuring means secured in a ground support for the aircraft and adapted for contacting the main load supporting members of the aircraft when such are moved thereonto; and a second load measuring means secured in the ground support and in spaced relation to the first load measuring means, the second load measuring means adapted for contacting the further secondary load supporting member of the aircraft when such is moved thereonto, whereby the first and second load measuring means define a T-like configuration and are positioned one to another such that the main and secondary load supporting members may both be supported on the apparatus at the same time.

As will be evident from the present disclosure, the aforementioned computer may be located either on-board the aircraft or offboard the same; the load data may be transmitted from the load-measuring device via cables or other means, including radio; the center of gravity data or information for determining such may be relayed to the pilot of the aircraft by visual or audio means. Also, the sensor means linked to the computer may be mounted beside or in the roadway over which the aircraft passes. Further, the computer may be linked to the load-measuring devices by cable means or radio means and the sensor may be linked to the computer by cable means or radio means.

A further important aspect of the present invention is the provision of a load cell comprising many compartmentalized sections which operate independently one of another. As indicated, the presently disclosed apparatus may be used in connection with other vehicles such as wheeled vehicles where individual wheel loadings are required to be determined.

The present invention provides apparatus which may be integrated with existing airport equipment to provide additional services.

The present invention provides an integrated aircraft weighing system comprising a computer keyed to a unique registered number of individual aircraft and programed with its characteristics, including landing gear configuration, weight and balance and other useful data which is alerted to that aircraft data when the aircraft passes a sensor suitably placed on the taxi ramp in the area of load-measuring cells linked thereto. The load-measuring cells are suitably disposed in or on the aircraft taxi ramp and register and transmit load data, in a predetermined manner, as the aircraft landing gear traverses the same. The computer is alerted to the configuration of the aircraft's landing gear and the disposition of the individual load cells over which they traverse and in turn, sorts and selects the registered loadings and provides the weight and balance data for that aircraft at that time and place.

The data is then available by visual or other means within the operator's areas and may be accessed and assesed as required from local and remote points for immediate and historical analysis. A visual readout is available at the taxi ramp as may be required.

Other aims and aspects of the present invention will become apparent from the reading of the description hereinafter.

BRIEF DESCRIPTION OF THE DRAWINGS

The invention is illustrated by way of example in the accompanying drawings wherein:

FIG. 1 is a diagrammatic perspective view of an apparatus in accordance with the present invention, and showing an aircraft about to utilize the apparatus.

FIGS. 1a and 1b illustrate diagrammatically examples of load cell means used in preferred embodiments of the present invention;

FIG. 1c is a diagrammatic view of a further embodiment of load cell means arrangement, in accordance with the present invention;

FIG. 2 is a diagrammatic perspective view similar to that of FIG. 1 but showing additional details.

FIGS. 3a and 3b represent a diagrammatic view showing a system in accordance with the present invention.

DESCRIPTION OF PREFERRED EMBODIMENTS

Figure 3B:
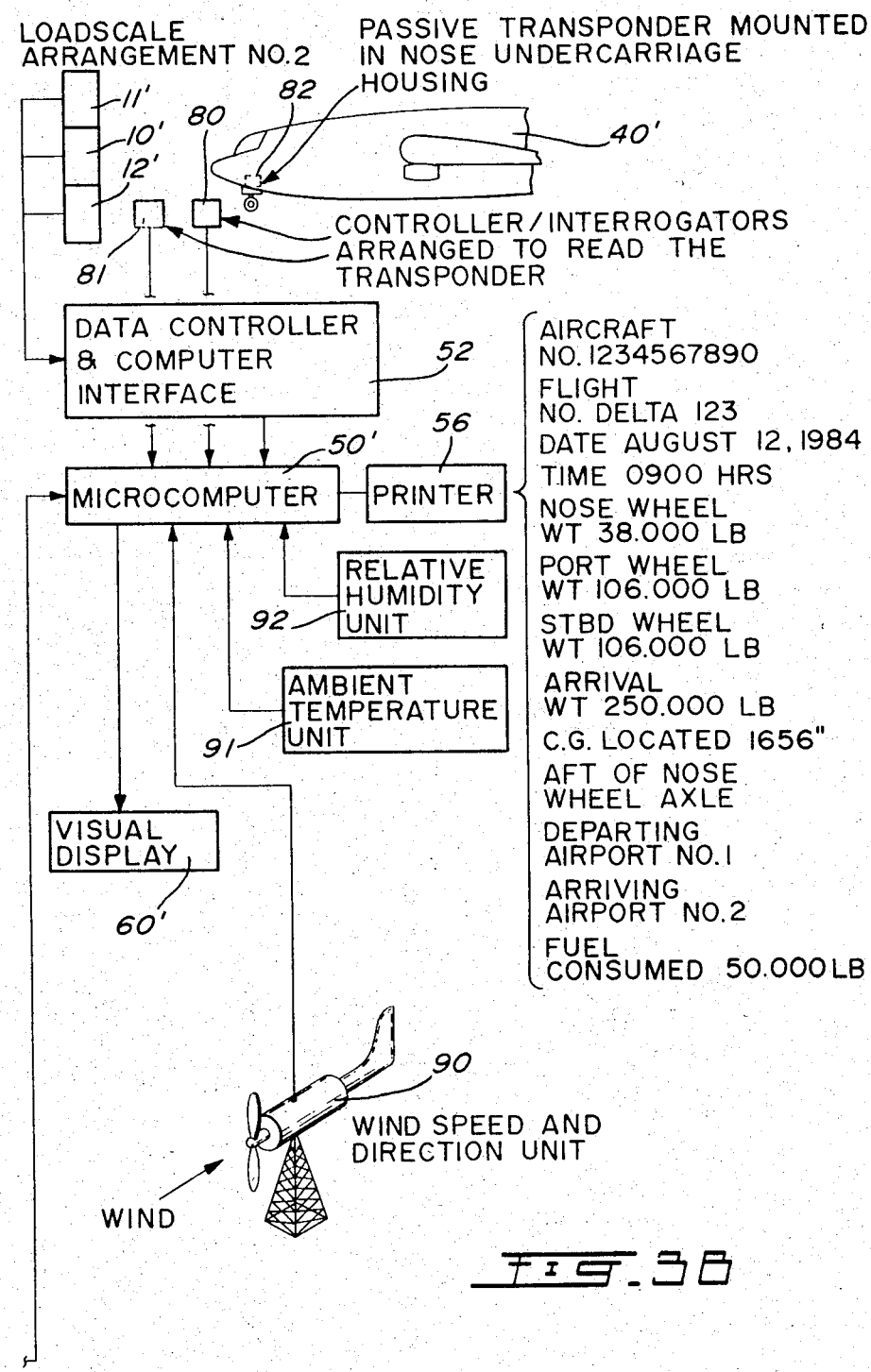

Referring to FIG. 1 illustrating basic aspects, there is shown an arrangement 100 comprising a plurality of load-measuring devices 10, 11 and 12, secured in a runway or roadway 20 and adapted, i.e., positioned such that they contact respectively the load-supporting members, i.e., individual undercarriage members 30, 31 and 32, of the aircraft 40 as such is moved thereover, either by driving or other means (not shown). Further shown is a computer means comprising a micro computer means 50, linked by cable means 51 to load-measuring devices 10, 11 and 12, and a data relaying means 60 for relaying (visually) to the pilot of aircraft 40, data computed by micro computer means 50. Also shown is a remote readout means 70 which may comprise a further data relaying means 60 and mounted in the operations management quarters of the airport. Upstream of load-measuring devices 10, 11 and 12, is a code sensor means 80 for use in alerting micro computer means 50 of characteristics of aircraft 40 as it passes the same upon being driven or otherwise moved along roadway 20 toward load-measuring devices 10, 11 and 12.

Load-measuring devices 10, 11 and 12, each comprise a load cell means of suitably commercially available type, for example, ones manufactured by Toledo Scale Ltd. Each of said load cell means comprises a weigh platform means supported upon at least one load-measuring cell, such is shown diagrammatically in FIG. 1a, wherein X denotes the weigh platform means mounted in roadway 20 and Y denotes a single load-measuring cell. FIG. 1b shows a further example of load cell means similar to that shown in FIG. 1a, utilizing two load-measuring cells. Thus, FIGS. 1a and 1b depict two examples of load-measuring devices in accordance with the present invention and others, as may be realized, may comprise many more load-measuring cells.

FIG. 1c illustrates a further embodiment in accordance with the present invention, being identical to that of FIG. 1, except wherein a single elongated load measuring means 10" is used in roadway 20. As seen, load measuring means 10" extends laterally of the roadway 20 so as to be contacted by all undercarriage members 30, 31 and 32 of aircraft 40. If desired, load measuring means 10" may be extended in size lengthwise of roadway 20 sized to accommodate all undercarriage members 30, 31 and 32, at a given time, such being useful for gross weight measurements. The extension of load measuring means 10" is denoted by the laterally extending dotted line in roadway 20. Thus, FIG. 1c embodiment in the first instance, provides an arrangement whereby the longitudinal center of gravity of aircraft 40 may be determined.

Load-measuring devices 10, 11 and 12 are mounted in roadway 20 so as to be flush or substantially flush with the surface thereof. As seen, devices 11 and 12 are mounted in side-by-side relation whereby they may be contacted respectively by individual undercarriage members 31 and 32. As further seen, device 10 is mounted upstream of devices 11 and 12, whereby it may be contacted by individual undercarriage member 30. As may be realized, as an alternative, device 10 may be mounted downstream of devices 11 and 12. Thus, it is seen devices 10, 11 and 12 are strategically located within roadway 20 whereby they may be contacted by the individual undercarriage members 30, 31 and 32, for use in recording the load applied to the roadway 20 by the aircraft's individual load-supporting members.

It is evident devices 10, 11 and 12 may be housed in a single bounded arrangement or perhaps a single cell body having compartmentalized sections representing devices 10, 11 and 12. To illustrate this, chain dotted lines are shown extending across roadway 20 to define a rectangle, bounding devices 10, 11, and 12. Alternative designs of load-measuring devices may include a great number of compartmentalized devices for use in contacting various undercarriage configurations of aircraft ranging from small light planes to the heaviest of military aircraft.

Roadway 20 represents a conventional taxiway or runway as may be found at any airport.

Undercarriage members 30, 31 and 32 comprise a well-known tricycle configuration and it is evident that member 30 alternatively might comprise a tail wheel, which likewise moves generally along the center of the runway and would contact device 10.

Micro computer means 50 is of wellknown type and may comprise, for example, ones manufactured by International Business Machines Ltd. Although micro computer means 50 is interconnected to load-measuring devices 10, 11 and 12, via cable means 51a, the latter may be replaced by other suitable means including radio transmitting and receiving means (not shown) capable of conveying signals from the load-measuring means.

Data relaying means 60 comprises a scoreboard type readout of suitable commercially available type, including ones manufactured by Toledo Scale Ltd. Data relaying means 60 may be interconnected to micro computer means 50 via cable means 51 or alternatively by other means including radio transmitting and receiving means (not shown) as mentioned above.

Remote readout means 70 interconnected to micro computer 50 by conventional cable means, is of wellknown type such as that manufactured by Toledo Scale Ltd. The latter displays data displayed on readout scoreboard 60 for use of operations management of the airport. In the event micro computer means 50 is located onboard aircraft 40, data therefrom would be transmitted to readout means 70 by radio or other suitable means deemed wellknown to those to which the present invention is directed.

Code sensor means 80 is of any suitable commercially available type including ones of the optical type and ones manufactured by Glenayre Electronics Ltd., Vancouver, British Columbia, such being interconnected by cable means or other suitable means, to micro computer means 50. As seen in FIG. 1, code sensor means 80 is positioned upstream of load-measuring means 10, 11 and 12, so as to "read" the type of aircraft as it passes thereby in movement toward devices 10, 11 and 12.

Referring to operation of arrangement 100, aircraft 40 passes along roadway 20 in the direction of the arrow shown, and as it passes by sensor means 80, the latter "reads" the aircraft and in effect alerts micro computer means 50 of the type of aircraft (for which it is keyed) approaching load-measuring devices 10, 11 and 12. As the aircraft rolls over devices 10, 11 and 12, the load data is transmitted therefrom to micro computer means 50 which then computes data based on its keying and thereafter transmits the data to scoreboard readout 60 and remote readout means 70. The displayed data may merely comprise the load applied by the individual undercarriage members of the aircraft for use by the pilot in compiling the center of gravity of the aircraft and gross weight thereof or it may alternatively comprise the center of gravity information together with the gross weight. Given this latter information, the pilot is enabled to plan further operation of the aircraft to ensure a safe and efficient takeoff of the same.

As may be realized, a landing aircraft may utilize arrangement 100 thereby providing useful data to the operations management of the airport, enabling it to monitor the magnitude of loads carried by the aircraft and disposition thereof with respect to the same.

The present invention contemplates other embodiments whereby said computer means, said means for relaying said computed data and said sensor means, are located in aircraft 40, either as part of same or applied as auxiliary equipment.

Reference is now made to the embodiment shown in FIG. 2, being similar to that shown in FIG. 1 but including further refinement.

Referring to FIG. 2, there is shown an arrangement 200 comprising a plurality of load-measuring devices 10', 11' and 12', each comprise a load cell means, the devices being secured in a roadway or runway 20' and adapted, i.e., positioned such that they contact respectively the load-supporting members, i.e., individual undercarriage members 30', 31' and 32' of the aircraft 40' as such is moved thereover.

Load-measuring devices 10', 11' and 12' are linked by a cable means 51' to a micro computer means 50' via a data controller and a computer interface means 52. A data relaying means 60' for relaying (visually) to the pilot of aircraft 40' is also linked by a cable means 53 to micro computer means 50'. Also provided is a remote readout means (not shown) which may comprise a further data relaying means 60', part of a main frame computer means 70'.

Upstream of load-measuring devices 10', 11' and 12' is an arrangement of controller/interrogators 80 and 81, mounted within roadway 20' and linked respectively by cable means 54 and 55 to micro computer means 50'. Controller/interrogators 80 and 81 are arranged such that as aircraft 40' travels along roadway 20', controller/interrogator 80 reads the unique identifying number programed into the passive transponder 82 located in the nose wheel undercarriage 30' housing. As the aircraft 40' continues to travel along the roadway 20', the controller/interrogator 81 also reads the unique identifying number programed into the passive transponder 82 whence the micro computer 50' is alerted to the unique registered number of aircraft 40' and to the speed at which the aircraft is approaching the load-measuring devices 10', 11' and 12'. Also seen is a wind speed and direction unit 90, ambient air temperature unit 91 and relative humidity unit 92, all being of suitable commercially available type and all linked as input devices to micro computer means 50', via cable means 93. As further seen, micro computer means 50' comprises a printer 56 connected via a cable means 56a.

A set of predetermined corrective factors are thereby applied to data transmitted through load-measuring devices 10', 11' and 12' to compensate for (1) transient inaccuracies introduced because of aircraft passing at variable speed over load-measuring devices of finite length; and (2) inaccuracies introduced because of wind strength and direction, ambient air temperature and relative humidity.

As further seen, micro computer means 50' is shown linked by cable means 56b to main frame computer means 70. The latter, it is anticipated, would be mounted in the corporate headquarters of an airline and linked by cable means to a micro computer means 50' located in the airline operations management area, in each of the airports in which that airline is active. This concept, whereby the fuel consumed by an aircraft in the process of flying from one airport to another airport, is shown diagrammatically in FIGS. 3a and 3b and referred to hereinafter.

Load measuring devices 10', 11' and 12' each comprise a load cell arrangement of suitable commercially available type, for example, ones manufactured by Toledo Scale Limited, under the trade name TRUCK-MASTER and having the weighbridge platform suitably arranged and disposed to accommodate the range of anticipated aircraft undercarriage and wheel arrangements. Installation of devices 10', 11' and 12' would thus be similar to those discussed above in respect of embodiment 100.

Micro computer means 50' is of wellknown type and may comprise, for example, ones manufactured by International Business Machines Limited under the trade name IBM PC XT. Although the micro computer means 50' is shown interconnected to all other devices by cable means, it will be understood, the latter may be replaced by other suitable means including radio transmitting receiving means (not shown) capable of communicating signals to and from the micro computer means.

Data controller and computer interface means 52 is of suitable commercially available type, for example, one manufactured by Toledo Scale Limited under the trade name TSM 3000 DATA CONTROLLER.

Printer means 56 comprises a daisy wheel or dot matrix printer of suitable, commercially available type, including one manufactured by Epson Limited under the trade name RX-80.

Data relaying means 60' comprises a scoreboard type readout of suitable commercially available type, including ones manufactured by Toledo Scale Limited.

Main frame computer means 70' comprises a computer of suitable, commercially available type, including ones manufactured by International Business Machines Limited under the trade name IBM 3083.

As may be realized, operation of arrangement 200 is similar to that of arrangement 100.

Reference is now made to FIGS. 3a and 3b showing a block diagram representation of a system, thus a method based on the use of the apparatus shown in FIG. 2. Thus FIGS. 3a and 3b shows a system allowing access by an airline to weight and location of center of gravity of an aircraft when such is (a) departing from a first airport; (designated No. 1); and (b) arriving at a second airport (designated No. 2).

Referring to FIGS. 3a and 3b, there is shown an arrangement comprising devices located at an airport No. 1, an airport No. 2, and at the airline common facilities, such as the head office thereof. For the purposes of this embodiment only, devices located at and description of operation of those devices, located at airport No. 1, are assumed to be identical to those located at airport No. 2.

Referring to airport No. 1, aircraft 40' with passive transponder 82, is moved over load-measuring devices 10', 11' and 12' prior to takeoff. The weight data derived is transmitted to computer means 50' and corrected for inaccuracies, cited previously. Micro computer means 50' computes the gross weight of aircraft 40' by combining the individual weights measured by load-measuring devices 10', 11' and 12'. Micro computer means 50' also computes the center of gravity of aircraft 40' by taking moments about a fixed point on aircraft 40' caused by the loads measured by load-measuring devices 10', 11' and 12' and equates this to the moment caused by the computed gross weight of the aircraft acting at the location of the center of gravity.

Referring to airport No. 2, aircraft 40' is moved over load-measuring devices 10', 11' and 12' immediately after landing. The weight data derived is transmitted to the micro computer means 50' and corrected for inaccuracies cited previously. As in airport No. 1, the new gross weight and center of gravity are computed by micro computer means 50'. Micro computer means 50' then also computes fuel consumed in getting from airport No. 1 to airport No. 2, by subtracting the computed gross weight of aircraft 40' immediately after landing at airport No. 2 from the computed gross weight of aircraft 40' just prior to takeoff from airport No. 1.

Figure 4A:
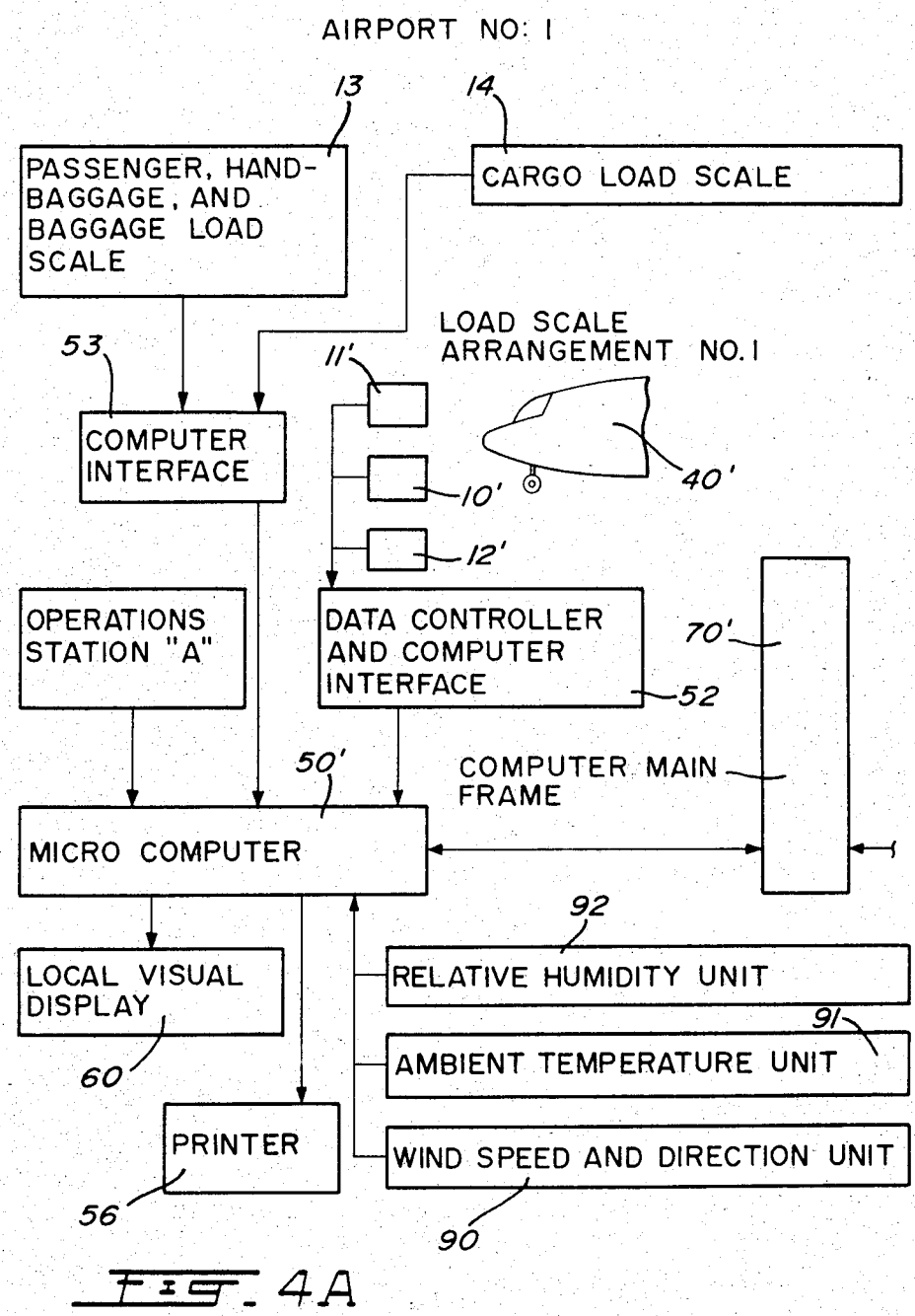
FIGS. 4a and 4b represent a diagrammatic view showing a further system in accordance with the present invention.
Figure 4B:
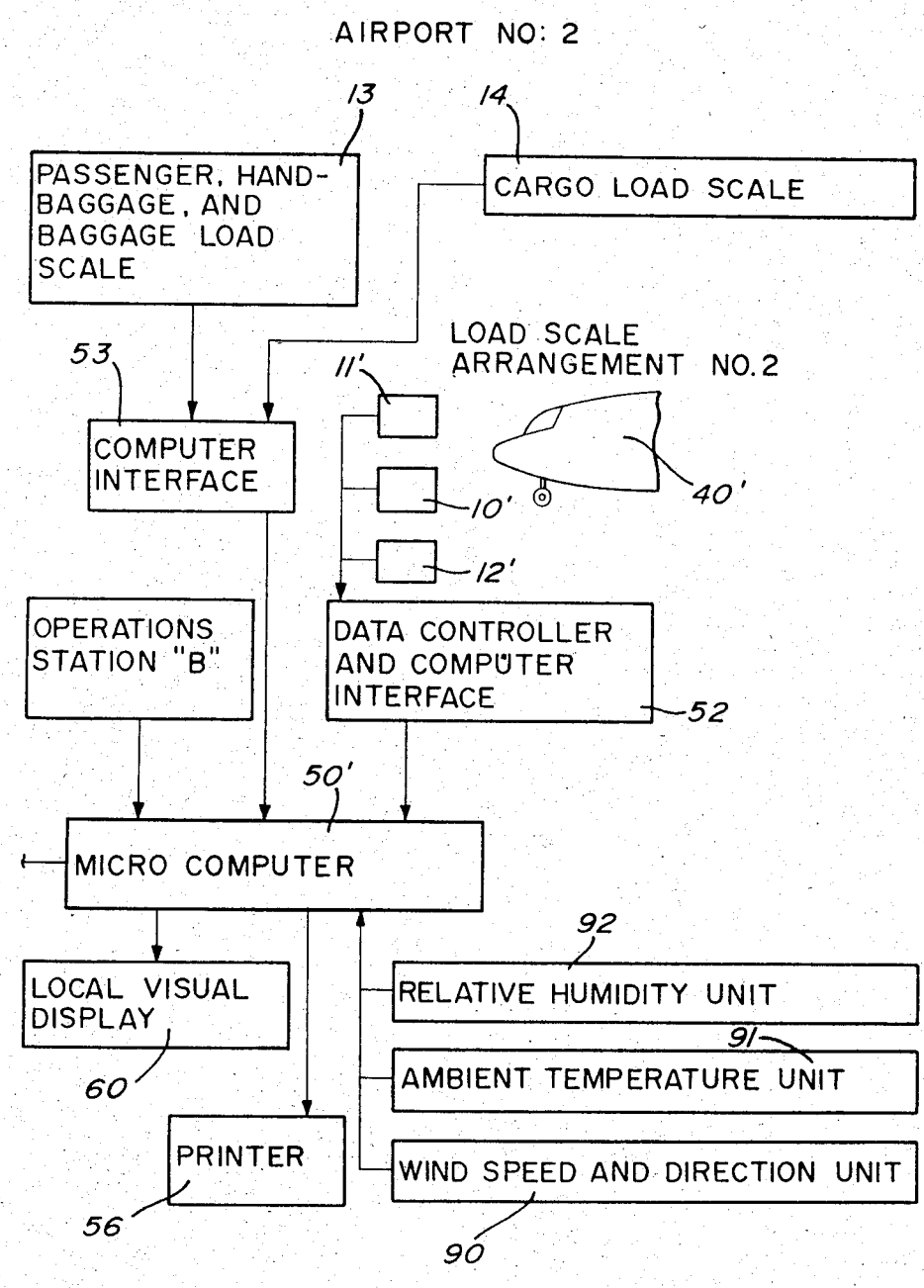

Reference is now made to FIGS. 4a and 4b showing a further block diagram representation of a further system and accordingly further method in accordance with the present invention for use in determining weight of available fuel in an aircraft, prior to its taking off, again based on use of apparatus in accordance with the present invention, shown, for example in FIGS. 3a and 3b.

With reference to FIG. 4a and airport No. 1 passengers, hand baggage and baggage are weighed in at the airline check-in counter by means of a weigh scale means 13, such as Howe-Richardson Model 5400 XL and which same is connected to a digital weight indicator complete with a computer output means 53 such as Howe-Richardson Model UMC 2000. The latter weights are coded as to destination and/or assigned seating and coded as to particular airport and aircraft at the operations station "A" and entered into micro computer means 50'.

Cargo is weighed in the cargo area by means of a weigh scale means 14 such as Howe-Richardson Model 5402 XL and which same is connected to a weight indicator complete with computer output signal means 53 such as Howe-Richardson Model UMC 2000. These weights are coded as to destination, received by the operations station and entered into micro computer means 50'.

The aircraft 40' is moved over load-measuring device means 10', 11' and 12' and the weight data is transmitted to computer means 50' which computes the gross weight of aircraft 40' as aforedescribed. The sum of the measured weights of passengers, hand-baggage, baggage, cargo and the "light" weight of aircraft 40' is subtracted from the measured gross weight of aircraft 40' just prior to takeoff, in order to obtain the weight of available fuel.

With reference to FIG. 4b, and airport No. 2, the measured gross weight of aircraft 40' just after landing, is entered into micro computer means 50' as the aircraft 40' is moved over load-measuring device means 10', 11' and 12'.

Passengers, hand baggage, baggage and cargo with destination airport No. 2, leave the aircraft 40'.

Micro computer means 50' then subtracts the sum of the weights of passengers, hand baggage, baggage and cargo coded for destination airport No. 2 from the measured gross weight of aircraft 40', just after landing at airport No. 2.

In the same manner as in airport No. 1, new passengers, hand baggage, baggage and cargo are weighed, coded and entered into micro computer means 50'.

The measured gross weight of aircraft 40' prior to takeoff from airport No. 2 is computed by micro computer means 50', as the aircraft is moved over load-measuring device means 10', 11' and 12' as aforedescribed. The new sum of weights of new passengers, hand baggage, baggage, cargo and "light" weight of aircraft 40', is subtracted from the measured gross aircraft weight prior to takeoff from airport No. 2, in order to obtain the weight of available fuel prior to takeoff from airport No. 2.

It is anticipated historical data may be utilized in place of measured passenger weights and baggage in computing the weight of available fuel.

The present invention is deemed to represent a major advance in the art of operating and controlling aircraft, particularly in providing safer operation thereof.

We claim:

1. An apparatus for use in determining the respective weight and center of gravity of different types of aircraft rapidly prior to their successively taking off, each aircraft including at least a pair of laterally spaced main undercarriage wheels and a tail or nose wheel longitudinally spaced from said main under-carriage wheels with the lateral spacing between the main undercarriage wheels as well as the longitudinal spacing between the nose or tail wheels and the main undercarriage wheels varying substantially from one type of aircraft to another, said apparatus comprising in combination:

(a) a plurality of load measuring devices secured to a roadway in spaced relation one to another and integrally forming part of said roadway, ones of said devices each comprising an elongated aircraft wheel supporting platform extending transversely of said roadway for respectively receiving and supporting the respective varyingly spaced main undercarriage wheels of said different types of aircraft as said aircraft are moved along a common path of travel upon said roadway, said path extending in a direction generally normal to the length of each platform, a further one of said devices comprising an aircraft wheel supporting platform positioned in said path of travel for receiving and supporting the respective nose or tail wheel of said different types of aircraft as said aircraft are moved along said common path of travel;

(b) aircraft weight readout means linked to said load measuring devices for displaying load data measured thereby upon said platforms receiving and supporting thereon said respective aircraft nose or tail and main undercarriage wheels; and (c) computer means operatively connected in the link between said load measuring devices and said aircraft weight readout means, for use in computing the respective center of gravity of said different types of aircraft following successive arrival of the wheels thereof on said platforms, said computing of said centerof gravity of each respective aircraft utilizing data entered into said computer means, said data comprising nose or tail wheel to main undercarriage wheel spacing and the loads measured by said load measuring devices, whereby following said computing, center of gravity data for the aircraft may be is displayed on said readout means.

2. An apparatus as defined in claim 1, wherein each of said aircraft wheel supporting platforms extends lengthwise of said roadway a distance sufficient to ensure recordal by each load measuring device of the load applied by the respective aircraft wheel as it rolls over each platform at a selected speed, thereby to provide successive dynamic weighing of said aircraft.

3. An apparatus as defined in claim 2, wherein said distance is sufficient to ensure that the nose or tail and main undercarriage wheels of the respective different aircraft are simultaneously received and supported for weight recordal by said respective wheel supporting platforms, thereby to provide successive static weighing of said aircraft.

4. An apparatus as defined in claim 1, wherein said readout means is located exteriorly of said aircraft.

5. An apparatus as defined in claim 1, wherein said readout means is located interiorly of said aircraft.

6. An apparatus as defined in claim 1, wherein said computer means is located exteriorly of said aircraft.

7. An apparatus as defined in claim 1, wherein said computer means is located interiorly of said aircraft.

8. An apparatus as defined in claim 1, wherein at least part of the operation of said computer means is activated or controlled by a sensor means operatively linked to said computer means, said sensor means being activated when a signal therefrom is intercepted by a transponder on said aircraft.

9. An apparatus as defined in claim 1, wherein at least part of the operation of said computer means is activated or controlled by a sensor means operatively linked to said computer means, said sensor means being activated by a signal transmitted from said aircraft.

10. An apparatus as defined in claim 1, wherein at least part of the operation of said computer means is activated or controlled by a sensor means operatively linked to said computer means, said sensor means being activated by a signal transmitted from said aircraft, said signal being transmitted to said sensor means via a transponder means on said aircraft.

11. An apparatus as defined in claim 1, wherein at least part of the operation of said computer means is activated or controlled by a sensor means operatively linked to said computer means, said sensor means being activated by a signal transmitted from said aircraft, said signal being transmitted to said sensor means via a transponder means on said aircraft in response to a signal emitted thereto by said sensor means.

12. An apparatus as defined in claim 1, including wind speed and wind direction measuring means operatively linked to said computer means for entering therein wind speed and wind direction data, permitting said computed weight and center of gravity data to possibly be adjusted for such environmental factors.

13. An apparatus as defined in claim 1, including a humidity measuring means operatively linked to said computer means for entering therein humidity data, permitting said computed weight and center of gravity data to possibly be adjusted for such environmental factor.

14. An apparatus as defined in claim 1, including an ambient temperature measuring means operatively linked to said computer means for entering therein ambient temperature data, thereby permitting said computed weight and center of gravity data to possibly be adjusted for such environmental factor.

15. An apparatus as defined in claim 1, including controller/interrogator means linked to said computer means for respectively entering therein aircraft travel speed as said aircraft rolls along said roadway toward said load measuring devices and unique identity data of said aircraft as said aircraft approaches said load measuring devices, said controller/interrogator means being activated for operation upon interface with means on said aircraft, whereby said computer means is accessed for characteristics of said uniquely identified aircraft which is utilized by said computer means for computing said weight and center of gravity data.

16. An apparatus as defined in claim 1, wherein said platforms extend in elongated manner to define a T-like shaped configuration.

17. A method for determining the location of the center of gravity of an aircraft, prior to its taking off, said aircraft including a nose or tail wheel and at least a pair of laterally spaced main undercarriage wheels, said method comprising the steps of:

(a) moving the aircraft upon said wheels along a path of travel upon a roadway lengthwise thereof in preparation for take-off, which path of travel is common with other aircraft using said roadway for take-off, said other aircraft having nose or tail wheels whose spacing with respect to their main undercarriage wheels varies substantially as does the lateral spacing of the main undercarriage wheels one to another;

(b) maintaining said movement along said path of travel, including passing the wheels of the aircraft over a load measuring means secured to and forming part of said aircraft roadway, said load measuring means comprising a single elongated platform extending transversely of said roadway for contact by all the wheels of said aircraft, as well as those of said other aircraft, as said wheels are received and supported upon said platform for registering the loads carried thereby;

(c) registering said loads and entering registered loads data into a computer means linked to said load measuring means;

(d) computing the location of the center of gravity of said aircraft utilizing said entered loads data and wheel spacing data of said aircraft also entered into said computer means; and (e) displaying said computed location of center of gravity on a readout means.

18. A method according to claim 17, including the step of pre-programming said computer means, said pre-programming step including entering said wheel spacing data of the aircraft into said computer means along with those of said other aircraft, and selectively accessing said wheel spacing data to carry out said computing of said location of center of gravity.

19. A method for determining the location of the center of gravity of an aircraft, prior to its taking off, said aircraft including a nose or tail wheel and at least a pair of laterally spaced main undercarriage wheels, said method comprising the steps of:

(a) moving the aircraft upon said wheels along a path of travel upon a roadway lengthwise thereof in preparation for take-off, which path of travel is common with other aircraft using said roadway for take-off, said other aircraft having nose or tail wheels whose spacing with respect to their main undercarriage wheels varies substantially as does the lateral spacing of the main undercarriage wheels one to another;

(b) maintaining said movement along said path of travel including passing the wheels of the aircraft over a load measuring means secured to and forming part of said aircraft roadway, said load measuring means being elongated to extend tranversely of said roadway for contact by all the wheels of said aircraft as well as of said other aircraft, as said wheels are received and supported upon said load measuring means for registering the loads carried thereby;

(c) registering said loads and entering registered loads data into a computer means linked to said load measuring means;

(d) computing the location of the center of gravity of said aircraft utilizing said entered loads data and wheel spacing data of said aircraft also entered into said computer means; and (e) displaying said computed location of center of gravity on a readout means.

20. A method for determining the center of gravity and the static weight of aircraft respectively one after another while each in turn is parked prior to preparation for take-off, said aircraft including a nose or tail wheel and at least a pair of laterally spaced main undercarriage wheels providing a three-point support for the aircraft and wherein the spacing between said nose or tail wheels and the main undercarriage wheels may vary substantially from one aircraft to another, and wherein the lateral spacing between said main undercarriage wheels may vary substantially from one aircraft to another, said method comprising the steps of:

(a) moving a first one of said aircraft upon its wheels along a path of travel upon a roadway therefor, said path of travel being in common with that of other different aircraft using said roadway;

(b) maintaining said movement of said first of said aircraft along said path of travel, including placing and parking the respective wheels thereof upon respective load measuring devices positioned in spaced relation one to another and forming part of said roadway for registering the respective loads carried by said respective wheels, said load measuring devices secured to said roadway and each including an aircraft wheel supporting platform whose top surface area is sufficient to receive and support the respective wheels of said respective aircraft as they pass along said common path of travel;

(c) registering said respective wheel loads as said aircraft wheels rest upon said platform;

(d) computing with a computer means the center of gravity of said first one of said aircraft, said computing utilizing at least the load data registered in step (c) and nose or tail wheel to main undercarriage wheel spacing data pertaining to said aircraft;

(e) moving said first one of said aircraft to remove the wheels thereof from said platforms;

(f) moving a second one of said aircraft upon its wheels along said path of travel upon said roadway;

(g) maintaining said movement of said second one of said aircraft along said path of travel and while maintaining said load measuring devices in position in said spaced relation one to another, placing and parking the respective wheels of said second one of said aircraft upon said respective wheel supporting platforms for registering the respective wheel loads of said second one of said aircraft;

(h) registering said respective wheel loads of said second one of said aircraft as the wheels thereof rest upon said platforms; and (i) computing with a computer means the center of gravity of said second one of said aircraft, said computing utilizing at least the load data registered in step (h) and nose or tail wheel to main undercarriage wheel spacing data pertaining to said second one of said aircraft.

21. A method according to claim 20, wherein said step (d) is performed during or subsequent to performing step (e).

22. A method according to claim 20, including the step of utilizing for said computing steps (d) and (i) at least one environmental factor, thereby permitting said loads registered in steps (c) or (h), or in both steps (c) and (h), to be adjusted to provide a more accurate determination of said center of gravity.

23. A method according to claim 21, including the step of utilizing for said computing steps (d) and (i) at least one environmental factor, thereby permitting said loads registered in steps (c) or (h), or in both steps (c) and (h), to be adjusted to provide a more accurate determination of said center of gravity.

24. An apparatus for use in determining the respective dynamic weight and center of gravity of different types of aircraft rapidly prior to their successively taking off, each aircraft including at least a pair of laterally spaced main undercarriage wheels and a tail or nose wheel longitudinally spaced from said main undercarrige wheels with the lateral spacing between the main undercarriage wheels as well as the longitudinal spacing between the nose or tail wheels and the main undercarriage wheels varying substantially from one type of aircraft to another, said apparatus comprising in combination:
  (a) a single load measuring device secured to a roadway and including an elongated aircraft wheel supporting platform extending transversely of said roadway for successively receiving and supporting the respective nose or tail wheel and varying spaced main undercarriage wheels of said different types of aircraft as said aircraft are moved along a common path of travel upon said roadway, said path extending in a direction generally normal to the length of said platform;
  (b) aircraft weight readout means linked to said load measuring device for displaying load data measured thereby upon said platform receiving and supporting thereon said respective aircraft nose or tail and main undercarriage wheels; and
  (c) computer means operatively connected in the link between said load measuring device and said aircraft weight readout means for computing the respective center of gravity of said different aircraft following successive arrival of the wheels thereof on said platform, said computing of the respective center of gravity of each aircraft utilizing data entered into said computer means, said data comprising nose or tail wheel to main undercarriage wheel spacing and the loads measured by said load measuring device, whereby following said computing, center of gravity data for the aircraft is displayed on said readout means.

25. An apparatus as defined in claim 24, wherein said readout means is located exteriorly of said aircraft.

26. An apparatus as defined in claim 24, wherein said readout means is located interiorly of said aircraft.

27. An apparatus as defined in claim 24, wherein said computer means is located exteriorly of said aircraft.

28. An apparatus as defined in claim 24, wherein said computer means is located interiorly of said aircraft.

29. An apparatus as defined in claim 24, wherein at least part of the operation of said computer means is activated or controlled by a sensor means operatively linked to said computer means, said sensor means being activated when a signal therefrom is intercepted by a transponder on said aircraft.

30. An apparatus as defined in claim 24, wherein at least part of the operation of said computer means is activated or controlled by a sensor means operatively linked to said computer means, said sensor means being activated by a signal transmitted from said aircraft.

31. An apparatus as defined in claim 24, wherein at least part of the operation of said computer means is activated or controlled by a sensor means operatively linked to said computer means, said sensor means being activated by a signal transmitted from said aircraft, said signal being transmitted to said sensor means via a transponder means on said aircraft.

32. An apparatus as defined in claim 24, wherein at least part of the operation of said computer means is activated or controlled by a sensor means operatively linked to said computer means, said sensor means being activated by a signal transmitted from said aircraft, said signal being transmitted to said sensor means via a transponder means on said aircraft, in response to a signal emitted thereto by said sensor means.

33. An apparatus as defined in claim 24, including wind speed and wind direction measuring means operatively linked to said computer means for entering therein wind speed and wind direction data, permitting said computed weight and center of gravity data to possibly be adjusted for such environmental factors.

34. An apparatus as defined in claim 24, including humidity measuring means operatively linked to said computer means for entering therein humidity data, permitting said computed weight and center of gravity data to possibly be adjusted for such environmental factor.

35. An apparatus as defined in claim 24, including an ambient temperature measuring means operatively linked to said computer means for entering therein ambient temperature data, thereby permitting said computed weight and center of gravity data to possibly be adjusted for such environmental factor.

36. An apparatus as defined in claim 24, including controller/interrogator means linked to said computer means for respectively entering therein aircraft travel speed as said aircraft moves along said roadway toward said load measuring device and unique identity data of said aircraft as said aircraft approaches said load measuring device, said controller/interrogator means being activated for operation upon interface with means on said aircraft, whereby said computer means is accessed for characteristics of said uniquely identified aircraft which is utilized by said computer means for computing said weight and center of gravity data.

* * * * *